United States Patent [19]

Wada et al.

[11]  4,454,105
[45]  Jun. 12, 1984

[54] PRODUCTION OF (MO,W) C HEXAGONAL CARBIDE

[75] Inventors: Tsuguyasu Wada; Evan K. Ohriner, both of Ann Arbor, Mich.

[73] Assignee: Amax Inc., Greenwich, Conn.

[21] Appl. No.: 432,630

[22] Filed: Oct. 5, 1982

[51] Int. Cl.$^3$ ............................................. C01B 31/34
[52] U.S. Cl. .................................... 423/440; 420/430; 501/93
[58] Field of Search .................... 423/440; 420/430; 75/0.5 BB, 84; 501/93

[56] References Cited

U.S. PATENT DOCUMENTS 4,216,009  8/1980  Miyake et al. ........................ 423/440
4,330,332  5/1982  Schachner et al. .................. 423/440

*Primary Examiner*—John Doll
*Assistant Examiner*—Steven Capella
*Attorney, Agent, or Firm*—Michael A. Ciomek

[57] ABSTRACT

Solid solutions of molybdenum and tungsten having molybdenum to tungsten atom ratios between about 1:1 and about 10:1 are produced by heating a mechanically milled mixture of a molybdenum oxide and tungsten oxide to a temperature between about 1000° C. and about 1300° C. at a rate of at least about 20° C. per minute in a hydrogen-containing atmosphere and holding at temperature to reduce the oxides of molybdenum and tungsten and to provide a homogeneous solid solution of molybdenum and tungsten. The homogeneous solid solution is mixed with a stoichiometric excess of carbon and heated to a temperature between about 1200° C. and about 1800° C. under a protective atmosphere to react the carbon with the alloy powder to form a solid solution of hexagonal monocarbides.

11 Claims, No Drawings

PRODUCTION OF (MO,W) C HEXAGONAL CARBIDE

FIELD OF THE INVENTION

The present invention relates to the production of alloy powders, and more particularly, to the production of solid solution powders of molybdenum and tungsten.

PRIOR ART

It has been recognized recently that it would be advantageous to substitute molybdenum monocarbide or mixtures of molybdenum and tungsten monocarbides for tungsten monocarbide. Various processes have been proposed to produce molybdenum or molybdenum-tungsten monocarbides. The more attractive of these processes relate to the use of prealloyed molybdenum-tungsten alloys as a starting material in order to minimize the problems associated with the formation of lower carbides, particularly lower molybdenum carbides.

Hexagonal tungsten monocarbide is readily produced by mixing finely divided tungsten metal with carbon black and heating the mixture to between about 1400° C. and about 1600° C. in a hydrogen-containing atmosphere. See "Tungsten" by Yih and Wang published by Plenum Press, New York, 1979, pps. 389 to 397. In the preparation of tungsten carbide, the size and distribution of the tungsten metal powder must be closely controlled with the average particle size being between about 1 micron and about 3 microns and the largest particle size being about 15 microns. The reason for such close control of the particle size and distribution of the tungsten metal is that the tungsten carbide produced therefrom closely correlates in size and distribution to the tungsten metal powder. A specific particle size is required for tungsten carbide depending on its application; relatively fine particle sizes, about 1 to 3 microns, are normally used in cemented carbide cutting tools for machining, whereas coarser particle sizes are common for abrasion-resistant applications. Coarser tungsten carbide provides the cemented carbide with a lower hardness but higher transverse rupture strengths.

Although molybdenum and tungsten are adjacent to each other in the same group of the Periodic Table and display similar chemical and physical properties, attempts to produce hexagonal molybenum monocarbide by methods conventionally employed to produce hexagonal tungsten monocarbide have been by and large unsuccessful. It has recently been discovered that solid solutions of hexagonal molybdenum and tungsten monocarbides can be produced by various techniques. For example, in U.S. Pat. No. 4,139,374 a process is disclosed for forming a solid solution of hexagonal tungsten monocarbide and molybdenum monocarbide. The process described in this patent comprises forming a blended mixture of the desired gross composition, heating the mixture to a temperature within a stability zone of cubic carbides, lowering the temperature to a range in which hexagonal monocarbides are stable, maintaining the temperature of the mixture at the lower temperature to complete the transformation from cubic to hexagonal monocarbides and recovering the solid solution of monocarbides. Although the process described in this patent is effective, the use of this process in commercial operations requires both close temperature control and higher temperatures than those conventionally used in the production of tungsten carbide.

Many of the control problems encountered in the process described in U.S. Pat. No. 4,139,374 are avoided by the processes described in U.S. Pat. Nos. 4,216,009 and 4,216,034, both to Miyake et al. The processes described by Miyake et al involve the use of prealloyed molybdenum and tungsten powders. In U.S. Pat. No. 4,216,034, a process is described in which compounds of molybdenum and tungsten having a particle size of less than 0.2 micron are reduced with carbon to produce a prealloyed powder from which a mixture of monocarbides can be produced. In U.S. Pat. No. 4,216,009, the process described involves reducing a mixture of molybdenum and tungsten compounds having a particle size less than one micron with hydrogen to produce a prealloyed powder for subsequent carburization to form monocarbides.

The stringent particle size control was necessary in the process described in U.S. Pat. Nos. 4,216,009 and 4,216,034 in order to obtain a sufficiently homogeneous alloy powder. This was a significant disadvantage, not only because it is costly to obtain a fine particle mixture in commercial production but also it may raise difficulties in producing a solid solution carbide with a sufficiently large particle size.

The present invention overcomes this disadvantage, enabling the use of a mixture of molybdenum and tungsten oxides having larger particle size than claimed in U.S. Pat. Nos. 4,216,009 and 4,216,034.

It has now been discovered that solid solutions of molybdenum and tungsten can be produced by a simplified process to form a prealloyed powder useful in the production of a mixture of monocarbides.

BRIEF SUMMARY OF THE INVENTION

Generally speaking, the present invention relates to the production of a solid solution of molybdenum and tungsten having a molybdenum to tungsten atom ratio of between about 1:1 and about 10:1. A mixture of mechanically milled oxides of molybdenum and tungsten is heated in a hydrogen-containing atmosphere at a reduction temperature between about 1000° C. and about 1300° C. to reduce the oxides to a homogeneous solid solution of molybdenum and tungsten. The rate of heating is at least about 20° C. per minute from about 650° C. to the reduction temperature. The alloy powders so produced are then subjected to a carburizing treatment which yields a solid solution of hexagonal molybdenum and tungsten carbides.

DETAILED DESCRIPTION OF THE INVENTION

An important aspect of the present invention is the production of a prealloyed, finely divided molybdenum-tungsten alloy which is useful as a starting material for the production of a solid solution of hexagonal molybdenum and tungsten monocarbides. The use of prealloyed powders allows the solid solution of hexagonal molybdenum and tungsten monocarbides to be produced using the simplified procedures conventionally employed in the production of hexagonal tungsten monocarbide.

The prealloyed powder produced by the process in accordance with the present invention contains molybdenum and tungsten. The molybdenum to tungsten atom ratio can vary between about 1:1 and about 10:1, and advantageously, between about 1:1 and about 6:1.

Prealloyed powder having molybdenum to tungsten ratios below the foregoing ranges can be employed, but the advantages of using molybdenum are minimized. The use of prealloyed powders containing molybdenum in excess of the foregoing ranges increases the tendency to form carbides other than hexagonal monocarbides.

As noted hereinabove, the prealloyed powders are advantageously finely divided. The size and distribution of the prealloyed powders are determined by the properties desired in the final carbide product. The use of finer prealloyed powders produces finer carbide particles which are harder than larger carbide particles, but the finer carbide particles results in lower transverse rupture strengths of the subsequently cemented carbide. In order to produce monocarbides having the desired physical properties, the prealloyed particles should have an average particle size between about 0.5 micron and about 5 microns, and advantageously, between about 1 micron and about 3 microns.

The prealloyed powders can be produced by heating a mixture of the oxides of molybdenum and tungsten in a hydrogen-containing atmosphere. Advantageously, a mixture of molybdenum oxide and tungsten oxide in amounts to provide molybdenum to tungsten atom ratios within the hereindisclosed ranges is fed to a ball mill and wet milled until the average particle size of the mixture is between about 0.3 micron and about 3 microns, advantageously, between about 0.5 micron and about 1.5 microns. Wet milling commercially available molybdenum oxide and blue tungsten oxide for between about 0.5 hour and about 5 hours, advantageously, between about 1 hour and about 3 hours, is usually sufficient to produce a uniform oxide mixture having the preferred particle size and size distribution. The milled mixture is then heated in a hydrogen-containing atmosphere at a reduction temperature between about 1000° C. and about 1300° C. to reduce the mixture of oxides to the metallic state and to produce a homogeneous solid solution of molybdenum and tungsten. The rate of heating from about 650° C. to the reduction temperature is at least about 20° C. per minute. The time required to reduce the oxide mixture and to produce a solid solution of the molybdenum and tungsten will vary depending upon the reduction temperature and the average particle size of the oxides but reduction times between about 1 hour and about 3 hours are generally sufficient. If the mixture contains molybdenum trioxide, the mixture is first heated to a temperature between about 500° C. and about 650° C. in a hydrogen-containing atmosphere to reduce molybdenum trioxide to molybdenum dioxide to minimize the volatilization of molybdenum trioxide during the high temperature reduction stage to the metallic state.

An important aspect of the present invention is the rate at which the mixture of tungsten oxide and molybdenum dioxide is heated to the reduction temperature from temperatures about 650° C. It has been found that the heating rates in excess of about 20° C. per minute insure the metallic product is a homogeneous solid solution of molybdenum and tungsten, even when the starting oxide mixture has an average particle size greater than about one micron.

Due to kinetic effects tungsten tends to reduce to metal powder at lower temperature than molybdenum for a given oxide particle size. The hydrogen reduction of tungsten dioxide to metal is normally completed in a few hours or less in the temperature range from 700° to 850° C. (see "Tungsten" by Yih and Wang, loc. cit.) whereas the reduction of molybdenum dioxide to metal at an equivalent rate requires temperatures in the range from 1000° to 1100° C. (see "The Metal Molybdenum" edited by J. J. Harwood, ASM, 1957, p. 40). Thus, there is a tendency for tungsten and molybdenum metals to be formed separately in the hydrogen reduction process even if the oxides of these two elements have been mixed. The use of a heating rate of greater than 20° C. per minute avoids the separate reduction of tungsten oxide prior to the start of the reduction of molybdenum oxide. Thus simultaneous reduction of the oxides of molybdenum and tungsten can be achieved with substantial beneficial effect on the homogenity of the alloy powder produced. Simultaneous reduction of the mixed oxides of molybdenum and tungsen, achieved through the use of heating rates of at least about 20° C. per minute during reduction in hydrogen, allows the production of a homogeneous solid solution of molybdenum and tungsten using oxide particle sizes of up to about 3 microns.

Rapid heating rates from about 650° C. to the final reducing temperature provide many advantages. The starting oxide mixture does not have to be milled for excessive times thereby increasing throughput rates and lowering overall operating costs. The ability to produce homogeneous solid solutions from oxide mixtures having a wider permissible average particle size allows greater flexibility of the choice of starting materials in the production of monocarbide solid solutions thereby increasing the range of the physical properties of the monocarbides. Significant energy savings and increased throughput rates in the reduction furnaces are achieved because long holding times at reducing temperatures are avoided. The foregoing advantages are realized with heating rates of at least about 20° C. per minute from 650° C. to the reducing temperature. However, higher heating rates of about 50° C. per minute and even 150° C. per minute insure that all of the foregoing advantages are realized.

The maximum heating rate that can be employed is that dictated by the type of furnace and the size of the oxide charge fed to the furnace. Any type of furnace that provides rapid heating rates while insuring good solid-solid contact between the oxide particles can be employed. Suspension type furnaces, such as fluid bed reactors, cannot be used, even though they provide high heating rates, because good solid-solid contact, required to insure a homogeneous solid solution, is not possible. Advantageously, indirectly heated furnaces having provisions for the introduction and withdrawal of hydrogen-containing gases and gaseous products of reaction are employed. Rotating table furnaces can be used but it is advantageous to use furnaces in which boats containing the oxide charge are fed.

The prealloyed powder is then fed to a blending mill to which carbon in the form of carbon black is added in excess of the stoichiometric amount required to form the monocarbides of molybdenum and tungsten. The amount of excess carbon employed is between aobut 0.05% up to about 0.3% and most advantageously between about 0.5% and about 0.2%. The mixture of prealloyed powder and carbon is advantageously blended in a ball mill for a sufficient period of time to provide a uniform mixture having the desired particle size and particle size distribution.

The blended mixture of carbon and prealloyed powder is then heated to a temperature between about 1200° C. and about 1800° C. sufficiently long in a protective atmosphere to insure the substantially complete reaction between the carbon and the prealloyed powder. Advantageously, the mixture of carbon and prealloyed powder is heated to a temperature between about 1400° C. and about 1700° C. for 1 hour to about 6 hours in a protective atmosphere. Most advantageously, the mixture of carbon and prealloyed powder is heated to a temperature between about 1400° C. and about 1700° C. in a hydrogen-containing atmosphere to facilitate the complete reaction of the carbon with the prealloyed powder.

The reaction between carbon and prealloyed powder can be accelerated by the addition of small but effective amounts of at least one iron group metal selected from the group consisting of iron, nickel or cobalt. Advantageously, cobalt is the metal employed to facilitate the reaction between carbon and the prealloyed powder because cobalt is frequently used in the production of cemented carbide and the presence of cobalt will not interfere with the properties of the final cemented carbide product. When an iron group metal is employed to facilitate the reaction between the carbon and the prealloyed powder, the iron group metal is added to the mixture of carbon and prealloyed powder in an amount between about 0.1% and about 2% and advantageously, between about 0.4% and about 1.5%. The iron group metal is most advantageously added during the blending step to insure that the metal is uniformly distributed through the mixture of carbon and prealloyed powder in order to maximize its effectiveness during the carbide formation step.

In order to give those skilled in the art a better understanding of the present invention, the following illustrative examples are given:

EXAMPLE 1

About 1350 grams (3 lb) of tungsten blue oxide, which were milled for 3 hours with water to a particle size of 0.6 to 0.7 micron, were mixed with $MoO_3$ to make the Mo:W atomic ratio of 7:3, and the mixture was milled for 1 hour with water. The resulting mixed oxide had a particle size of 1.0 to 1.4 micron. The mixture was placed in a molybdenum boat, and after the first stage reduction at 650° C. (1200° F.), it was heated to 1180° C. (2160° F.) in hydrogen at a rate of about 30° C. (55° F.) per minute average in the range from room temperature to 1180° C. (2160° F.), and held at 1180° C. (2160° F.) for 3 hours. The resulting alloy powder showed good homogeneity by X-ray diffraction.

EXAMPLE 2

About 200 grams (0.44 lb) of $MoO_3$ and ammonium para-tungstate with a Mo:W atom ratio of 7:3 were milled together for 3 hours without the addition of water. The mixed oxide had a particle size of 1.0 to 1.5 micron. After a preliminary reduction at 550° C. (1020° F.), it was reduced to an alloy powder in hydrogen at 1100° C. (2010° F.) with an average heating rate of 150° C. (270° F.) per minute. The homogeneity of the alloy powder was satisfactory.

EXAMPLE 3

About 3 kilograms (6.6 lb) of tungsten blue oxide and molybdic oxide with a Mo:W atom ratio of 7:3 was milled in water for 1 hour. The milled oxide had an average particle size of 1.0 micron with some oxide particles of up to 15 microns in size. The oxide was given a first stage reduction at 530° C. (985° F.) for 2 hours in hydrogen. About 250 grams (0.6 lb) of this oxide was given a second stage reduction by heating in hydrogen at an average rate of 150° C./min (270° F./min) from room temperature to 1080° C. (1975° F.) and held at this temperature for 4 hours. The alloy powder showed excellent homogeneity by X-ray diffraction. About 250 grams (0.6 lb) of oxide from the same batch was given the same second stage reduction, except that the heating rate was 17° C./min (30° F./min). The metal powder produced was not homogeneous.

EXAMPLE 4

About 3 kilograms (6.6 lb) of tungsten blue oxide and molybdic oxide with a Mo:W atom ratio of 7:3 was milled in water for 1 hour. The milled oxide powder had an average particle size of 1.0 to 1.1 microns. The milled oxide powder was reduced in the same manner as described in example 3, with a heating rate of approximately 150° C./min (270° F./min). The alloy powder was milled with carbon black and cobalt powder to produce a composition of 90.06% alloy powder, 1.00% cobalt and 8.94% carbon black by weight. Milling was performed in hexanes for 3 hours. The dried powder was placed in molybdenum boats, each containing 300 grams (0.66 lb) of powder and carburized in hydrogen at 1595° C. (2900° F.) for 2 hours. The carbide powder produced contained an average of 1.7% $M_2C$ with the balance hexagonal Mo-W monocarbide.

EXAMPLE 5

About 3 kilograms (6.6 lb) of tungsten blue oxide and $MoO_2$ with a Mo:W atom ratio of 7:3 was milled in water for 1 hour. The milled oxide had an average particle size of 1.4 microns. The oxide powder was reduced by heating in hydrogen from room temperature to 1095° C. (2000° F.) at an average heating rate of approximately 10 to 15° C./min (20° to 30° F./min) and then heated in hydrogen at 1095° C. (2000° F.) for approximately 3 hours. The alloy powder produced was found to be inhomogeneous by X-ray diffraction analysis. The alloy powder was milled with carbon black and cobalt and then carburized in the same manner as described in Example 4. The carbide powder produced contained 6.9% $M_2C$ with the balance hexagonal Mo-W monocarbide.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. A process for the production of a homogeneous solid-solution of molybdenum and tungsten which comprises: mixing finely divided oxides of molybdenum and tungsten to provide a molybdenum to tungsten atom ratio of between about 1:1 and about 10:1 and heating the mixture to a reducing temperature between about 1000° C. and about 1300° C. at a rate of at least about 20° C. per minute from about 650° C. to the reducing temperature in a hydrogen-containing atmosphere to provide a homogeneous solid solution of molybdenum and tungsten.

2. The process as described in claim 1 wherein the oxide mixture has a molybdenum to tungsten atom ratio between about 1:1 and about 6:1.

3. The process as described in claim 1 wherein the oxide particles have an average particle size between about 0.5 micron and about 5 microns.

4. The process as described in claim 3 wherein the oxide particle has an average particle size between about 1 micron and about 3 microns.

5. A process for the production of a solid solution of hexagonal molybdenum and tungsten monocarbides which comprises: establishing a mixture of oxides of molybdenum and tungsten, said mixture having a molybdenum to tungsten atom ratio between about 1:1 and about 10:1; milling the oxide mixture sufficiently long to provide a uniform mixture of oxides having an average particle size between about 0.3 microns and about 3 microns; heating the milled mixture to a reducing temperature between about 1000° C. and about 1300° C. at a rate of at least about 20° C. per minute from about 650° C. to the reducing temperature in a hydrogen-containing atmosphere to reduce the mixture of oxides to the metallic state and to produce a homogeneous solid solution of molybdenum and tungsten; mixing the reduced powder with a stoichiometric excess of finely divided carbon to provide a uniform mixture thereof and heating the mixture of alloy powder and the carbon to a temperature between about 1200° C. and about 1800° C. in a protective atmosphere sufficiently long to react the alloy with the carbon to produce a solid solution of hexagonal molybdenum and tungsten monocarbides.

6. The process as described in claim 5 wherein the alloy has a molybdenum to tungsten atom ratio between about 1:1 and about 6:1.

7. The process as described in claim 5 wherein the alloy particles have an average particle size between about 0.5 micron and about 5 microns.

8. The process as described in claim 7 wherein the alloy particle has an average particle size between about 1 micron to about 3 microns.

9. The process as described in claim 6 wherein the mixture of carbon and alloyed powder is heated to a temperature between about 1400° C. and about 1700° C.

10. The process as described in claim 9 wherein the mixture of carbon and alloy powder is heated in an atmosphere containing hydrogen.

11. The process as described in claim 9 wherein a small but effective amount of at least one iron group metal selected from the group consisting of iron, nickel and cobalt is added to the mixture of carbon and alloy powder to accelerate the reaction between the carbon and the alloy powder.

* * * * *